No. 821,220. PATENTED MAY 22, 1906.
J. E. COCHRAN.
WEIGHING SCALE.
APPLICATION FILED FEB. 25, 1905.
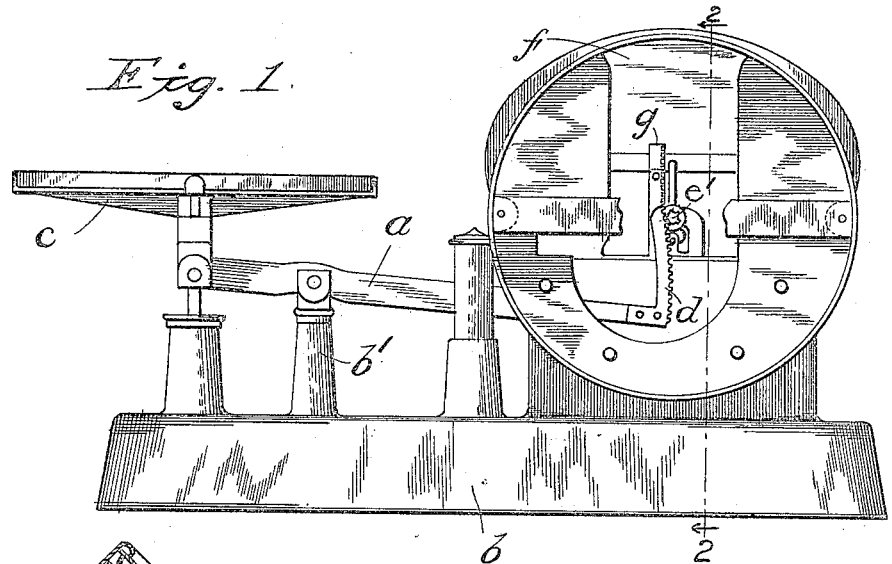
Fig. 1.
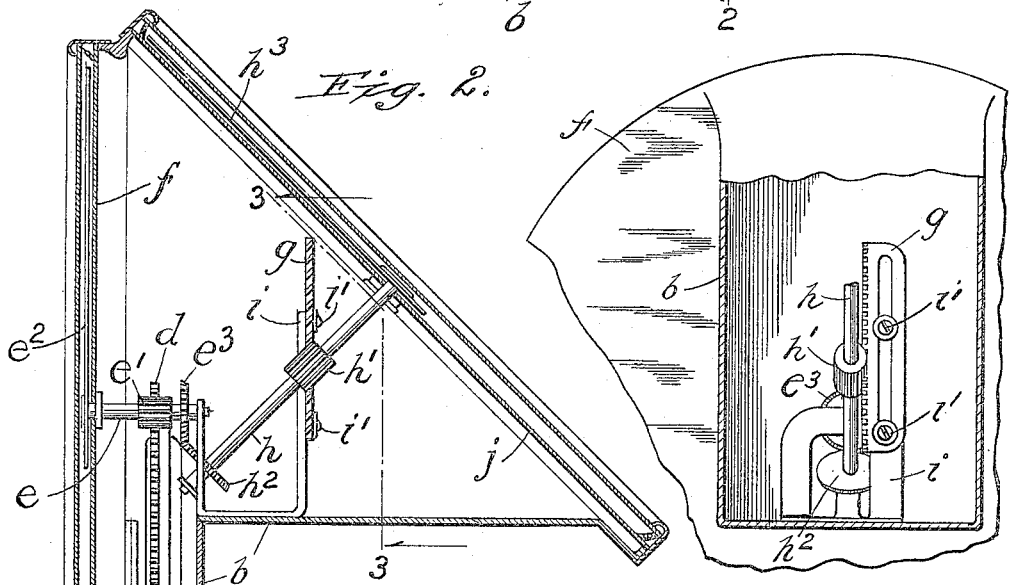
Fig. 2.
Fig. 3.
Fig. 4.
Witnesses:
Inventor:
Joseph E. Cochran
By Cheever & Cox
Atty's

UNITED STATES PATENT OFFICE.

JOSEPH E. COCHRAN, OF CHICAGO, ILLINOIS.

WEIGHING-SCALE.

No. 821,220.

Specification of Letters Patent.

Patented May 22, 1906.

Application filed February 25, 1905. Serial No. 247,333.

*To all whom it may concern:*

Be it known that I, JOSEPH E. COCHRAN, a citizen of the United States, residing at Chicago, in the county of Cook and State of Illinois, have invented a certain new and useful Improvement in Weighing-Scales, of which the following is a specification.

My invention relates to weighing-scales of the type shown, for example, in Patent No. 777,602, granted to me on the 13th day of December, 1904. In this form of scale a rack and pinion are employed to transfer the movement of the scale-beam to the pointer; and the object of this invention is to provide means for overcoming the effect of backlash or looseness in the gearing. This object is obtained by the mechanism illustrated in the accompanying drawings, in which—

Figure 1 is a general side view of the machine with one of the dials removed for exhibiting the interior mechanism. Fig. 2 is a vertical sectional view taken on line 2 2, Fig. 1. Fig. 3 is a sectional view taken on line 3 3, Fig. 2. Fig. 4 is a detail of the weighted rack which is designed to overcome the effects of backlash in the gearing.

Similar letters refer to similar parts throughout the several views.

The scale-beam $a$ is fulcrumed upon the posts $b'$ of the framework $b$ in the usual manner and carries at one end the pan $c$ and at the other end a toothed rack $d$, curved about the beam-fulcrum as a center. Said segmental rack $d$ is arranged to mesh with the pinion $e'$, rigidly secured to the shaft $e$, which shaft has a fixed axis and carries a pointer $e^2$ in such position that it will rotate in front of the face of the dial $f$ in the well-known manner. It will be understood, of course, that by thus imparting motion to the pointer by means of toothed gears there will be more or less lost motion or backlash, which will introduce an element of uncertainty in the reading of the pointer. In order to obviate this objection and hold the pinion $e'$ always tight up against the same side of the teeth of rack $d$, a weighted rack $g$ is arranged to act upon pinion $e'$ through the agency of pinion $h'$ and gears $h^2$ and $e^3$. Shaft $h$ is so mounted in the framework as to be rotatable about a fixed axis, and pinion $h'$ and gear $h^2$ are both rigidly secured upon said shaft. Bevel-gear $e^3$, which meshes with gear $h^2$, is rigidly secured to shaft $e$.

In the preferred construction rack $g$ is longitudinally slotted, so that it may be penetrated by the guide-pins $i'$ $i'$, which are fastened to the stationary interior upright $i$ and are provided with heads for keeping said rack in position. Rack $g$ is thus freely movable and it will, by reason of its weight, act constantly upon pinion $h'$ with a uniform force and will not only constantly maintain the teeth of bevel-gear $h^2$ in contact with the same relative surfaces of the teeth of gear $e^3$, but will also hold the teeth of pinion $e'$ constantly against the same relative surfaces of the teeth of rack $d$. In consequence the teeth of the various toothed parts may be cut so as to be loose and intermesh freely with a small amount of friction and yet the pointer will always be brought to rest in an absolutely correct position.

In the machine shown a second dial $j$ is arranged at an oblique angle to dial $f$, and in order that the pointer $h^3$ may rotate in a plane parallel to dial $j$ and be operated directly by shaft $h$ said shaft is oblique to shaft $e$, above mentioned, and consequently the gears $h^2$ and $e^3$ are bevel-gears.

In order that rack $g$ may travel in a vertical direction and at the same time mesh with pinion $h'$, the teeth whereof extend in the direction of the axis of shaft $h$, the faces of the teeth of said rack are inclined, as best shown in Fig. 2.

It will be noted that by the arrangement here shown, in which rack $g$ operates upon the last member (shaft $h$) of the train, all of the prior members of the train (wheels $h^2$, $e^3$, and $e'$) are held up tight against their respective drivers. Inasmuch as pointer $e^2$ is rigidly connected to one of the intermediate members (wheel $e'$) of the train, it follows that both pointers are connected through the agency of a single piece in addition to the parts constituting the train itself. In other words, there is only a single moving piece in the present mechanism which is not directly employed in transmitting motion from the scale-beam to the pointers, and as a result the mechanism is simple in construction and accurate in operation. Moreover, the gears may be and preferably are cut so as to intermesh loosely, and thereby eliminate, as near as may be, the development of friction.

What I claim as new, and desire to secure by Letters Patent, is—

1. In a weighing-scale, the combination with the scale-beam and beam-support, of a plurality of circular dials the planes whereof are arranged obliquely with reference to each other; pointers adjacent to said dials and rotating in planes parallel thereto; shafts at right angles to said pointers for operating the same; a pinion on one of said pointer-shafts, a rack operated by the scale-beam and meshing with said pinion, a pinion on the second shaft, a weighted rack meshing with said second pinion, and intermeshing gear-wheels on said shafts for transmitting rotation from one to the other thereof, said weighted rack and scale-beam rack being arranged on opposite sides of the train of gears whereby the weight of the weighted rack yieldingly opposes the forward movement of the scale-beam rack, and said racks, being on opposite extremities of the train of gears, a single weighted rack tends to avoid backlash in both of the pointer-shafts.

2. In a weighing-scale, the combination with the scale-beam and beam-support, of a plurality of reading-pointers moving in planes oblique to each other; shafts at right angles to each of said pointers for operating the same, gear-wheels connecting said shafts so as to rotate them equal amounts and one of said shafts being operated by the scale-beam; a gear-wheel on the other of said shafts and a toothed weighted rack meshing with said pinion for yieldingly opposing the rotation of said pointers in the positive direction, a single weighted rack thereby tending to avoid backlash in both of said pointer-shafts.

3. In a weighing-scale, the combination, with the scale-beam and beam-support, of a toothed rack upon said scale-beam, a horizontal pinion-shaft, a toothed pinion thereon operated by said rack, an inclined dial, a pointer-shaft at right angles thereto, a pointer on said shaft adapted to move in a plane parallel to said dial, toothed gears connecting said pinion-shaft and said pointer-shaft for driving the latter, a toothed pinion upon said pointer-shaft, and a toothed weighted rack adapted to mesh therewith for avoiding the effect of backlash upon the position of said pointer-shaft.

4. In a weighing-scale, the combination with the scale-beam and beam-support, of two dials disposed at an angle to each other, pointers adjacent to said dials, pointer-shafts geared together for operating said pointers, geared connections between one of said pointer-shafts and said scale-beam, a pinion $h'$ upon the other of said pointer-shafts and a toothed weighted rack meshing with said pinion for avoiding the effect of backlash upon the positions of said pointers.

5. In a weighing-scale, the combination with the scale-beam and beam-support, of two dials disposed at an angle to each other, pointers adjacent to said dials, pointer-shafts geared together for operating said pointers, geared connections between one of said pointer-shafts and said scale-beam, a pinion upon the other of said shafts, and a weighted rack adapted to mesh with said pinion for avoiding the effect of backlash upon the positions of said pointers.

6. In a weighing-scale, the combination with the scale-beam and beam-support, of two dials disposed at an angle to each other, pointers adjacent to said dials, pointer-shafts geared together for operating said pointers, geared connections between one of said pointer-shafts and said scale-beam, a pinion upon the other of said shafts, and a weighted rack for avoiding the effect of backlash upon the positions of said pointers, said rack being movable in a vertical direction and having oblique-faced teeth for meshing with said pinion, substantially as described.

7. In a weighing-scale, the combination with the scale-beam and beam-support, of two dials disposed at an angle to each other, pointers adjacent to said dials, pointer-shafts geared together for operating said pointers, a pinion upon each of said shafts, and a rack meshing with each of said pinions, one of said racks being carried by the scale-beam for rotating said pointers in the positive direction and the weight of the other of said racks being opposed to the rotation of said pointers in the positive direction, for the purpose mentioned.

In witness whereof I have hereunto subscribed my name in the presence of two witnesses.

JOSEPH E. COCHRAN.

Witnesses:
HOWARD M. COX,
W. W. PEET.